United States Patent
Tanaka (10) Patent No.: US 11,909,942 B2
(45) Date of Patent: Feb. 20, 2024

(54) PARALLAX DETECTING APPARATUS, IMAGE CAPTURING APPARATUS, PARALLAX DETECTING METHOD, AND STORAGE MEDIUM

(71) Applicant: CANON KABUSHIKI KAISHA, Tokyo (JP)

(72) Inventor: Shin Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 17/082,321

(22) Filed: Oct. 28, 2020

(65) Prior Publication Data
US 2021/0140765 A1  May 13, 2021

(30) Foreign Application Priority Data
Nov. 11, 2019 (JP) .................. 2019-204117

(51) Int. Cl.
*G01C 3/08*  (2006.01)
*H04N 13/232*  (2018.01)
*H04N 23/63*  (2023.01)

(52) U.S. Cl.
CPC ........... *H04N 13/232* (2018.05); *G01C 3/085* (2013.01); *H04N 23/63* (2023.01)

(58) Field of Classification Search
CPC .. G01C 3/085; H04N 5/23293; H04N 13/232; H04N 23/63; H04N 13/257; H04N 2013/0081; G06K 9/6203
USPC ....................................................... 356/4.01
See application file for complete search history.

(56) References Cited

U.S. PATENT DOCUMENTS 6,697,146 B2  2/2004  Shima
6,801,653 B1  10/2004 Wu et al.
8,576,329 B2  11/2013 Takamiya
(Continued)

FOREIGN PATENT DOCUMENTS

JP  2001-109879 A  4/2001
JP  2003-004442 A  1/2003
(Continued)

OTHER PUBLICATIONS

Jun. 19, 2023 Japanese Official Action in Japanese Patent Appln. No. 2019-204117.

*Primary Examiner* — Daniel L Murphy
(74) *Attorney, Agent, or Firm* — Venable LLP (57) ABSTRACT

There is provided a parallax detecting apparatus. A first obtainment unit obtains a first viewpoint image and a second viewpoint image that have different viewpoints from each other in a first direction. A second obtainment unit obtains displacement information that specifies a displacement amount in a second direction between positions in the first viewpoint image and the second viewpoint image corresponding to a same position in a shooting range. The displacement amount varies in conformity with a parallax amount between the positions. The second direction is perpendicular to the first direction. A calculation unit performs correlation calculation processing with respect to each of a plurality of reference regions corresponding to a plurality of reference positions in the second viewpoint image. A detection unit detects a parallax amount at a base position in the first viewpoint image based on calculated correlations.

20 Claims, 7 Drawing Sheets

(56) References Cited

U.S. PATENT DOCUMENTS

| | | | |
|---|---|---|---|
| 8,717,353 B2 * | 5/2014 | Sato | H04N 13/111 348/42 |
| 8,922,623 B2 | 12/2014 | Nishimura | |
| 9,100,559 B2 | 8/2015 | Tanaka | |
| 9,185,382 B2 | 11/2015 | Nishimura | |
| 9,313,419 B2 | 4/2016 | Tanaka | |
| 9,332,195 B2 | 5/2016 | Tanaka | |
| 9,361,680 B2 | 6/2016 | Takahashi et al. | |
| 9,438,877 B2 | 9/2016 | Wakabayashi et al. | |
| 9,998,650 B2 | 6/2018 | Tanaka | |
| 10,412,370 B2 * | 9/2019 | Sasaki | H04N 13/271 |
| 10,659,762 B2 | 5/2020 | Aoki | |
| 2002/0196423 A1 | 12/2002 | Shima | |
| 2011/0199506 A1 | 8/2011 | Takamiya | |
| 2012/0026295 A1 | 2/2012 | Nishimura | |
| 2014/0009577 A1 | 1/2014 | Wakabayashi et al. | |
| 2015/0071498 A1 | 3/2015 | Nishimura | |
| 2017/0270688 A1 | 9/2017 | Nobayashi | |
| 2020/0068186 A1 | 2/2020 | Aoki | |
| 2023/0072475 A1 | 3/2023 | Komatsu | |

FOREIGN PATENT DOCUMENTS

| | | |
|---|---|---|
| JP | 2010-140013 A | 6/2010 |
| JP | 4524514 B2 | 8/2010 |
| JP | 2012-212428 A | 11/2012 |
| JP | 2013-113600 A | 6/2013 |
| JP | 5489641 B2 | 5/2014 |
| JP | 2014-174088 A | 9/2014 |
| JP | 2015-007637 A | 1/2015 |
| JP | 6792662 B2 | 10/2015 |
| JP | 2018-105682 A | 7/2018 |
| WO | 2010/113389 A1 | 10/2010 |

* cited by examiner

PARALLAX DETECTING APPARATUS, IMAGE CAPTURING APPARATUS, PARALLAX DETECTING METHOD, AND STORAGE MEDIUM

BACKGROUND OF THE INVENTION

Field of the Invention

The present invention relates to a parallax detecting apparatus, an image capturing apparatus, a parallax detecting method, and a storage medium.

Description of the Related Art

An image capturing apparatus that obtains shot images and calculates distance information from the shot images has been proposed. For example, the image capturing apparatus obtains images from different viewpoints, derives a parallax amount from correlation values (a similarity degree) between the images, and obtains distance information. Specifically, the image capturing apparatus extracts image signals of a partial region including a target pixel as a base image from one image included in an image pair, and extracts image signals of a partial region from the other image as a reference image. The image capturing apparatus changes the position of extraction of the reference image, and calculates correlation values at respective positions. The image capturing apparatus calculates a parallax amount in the target pixel by deriving a position with the highest correlation from the correlation values at respective positions.

Furthermore, there is also a case where the calculation of a parallax amount uses a subpixel estimation method that estimates a parallax amount with a higher resolution with use of a correlation value at a position with the highest correlation and correlation values of neighboring positions in a reference image. In this case, a displacement may occur between a base image and the reference image also in a direction that is different from a direction in which parallax has been estimated to occur. This displacement causes the occurrence of an error in accordance with a subject when a parallax amount is calculated.

On the other hand, a method of changing a search direction in line with a displacement amount in a direction that is different from a parallax direction, rather than the parallax direction, has been proposed (Japanese Patent No. 5489641). Furthermore, a method of including different directions in the search has also been proposed (Japanese Patent Laid-Open No. 2003-4442). Moreover, a method of dividing into blocks in a direction perpendicular to a parallax direction and correcting an image before the search (Japanese Patent No. 5792662) has also been proposed. In addition, a method of selecting the optimal shape from block shapes obtained by deforming the difference between the appearances of a base image and a reference image has also been proposed (Japanese Patent No. 4524514).

While a displacement amount between a base image and a reference image in a direction perpendicular to a parallax direction varies in conformity with a parallax amount, conventional techniques do not take into consideration the variation in the displacement amount that is in conformity with the parallax amount. Therefore, with conventional techniques, an error attributed to the varying displacement amount cannot be reduced appropriately when the parallax amount is calculated.

SUMMARY OF THE INVENTION

The present invention has been made in view of the aforementioned situation, and provides a technique to improve the accuracy of parallax amount detection based on a correlation between images.

According to a first aspect of the present invention, there is provided a parallax detecting apparatus comprising at least one processor and/or at least one circuit which functions as: a first obtainment unit configured to obtain a first viewpoint image and a second viewpoint image that have different viewpoints from each other in a first direction; a second obtainment unit configured to obtain displacement information that specifies a displacement amount in a second direction between positions in the first viewpoint image and the second viewpoint image corresponding to a same position in a shooting range, the displacement amount varying in conformity with a parallax amount between the positions, the second direction being perpendicular to the first direction; a selection unit configured to select, in the first viewpoint image, a base region corresponding to a base position of parallax amount detection; a calculation unit configured to perform correlation calculation processing with respect to each of a plurality of reference regions corresponding to a plurality of reference positions in the second viewpoint image, the correlation calculation processing including first correction processing and calculation processing, the first correction processing correcting at least one of a position of the base region in the second direction and a position of the reference region in the second direction based on the displacement information so as to reduce a displacement that occurs between the base position and the reference position in the second direction and that is in conformity with a parallax amount between the base position and the reference position, the calculation processing calculating a correlation between the base region and the reference region that reflect the first correction processing; and a detection unit configured to detect a parallax amount at the base position based on each correlation between the base region and each of the plurality of reference regions.

According to a second aspect of the present invention, there is provided an image capturing apparatus, comprising: the parallax detecting apparatus according to the first aspect, and an image sensor configured to generate the first viewpoint image and the second viewpoint image.

According to a third aspect of the present invention, there is provided a parallax detecting method executed by a parallax detecting apparatus, comprising: obtaining a first viewpoint image and a second viewpoint image that have different viewpoints from each other in a first direction; obtaining displacement information that specifies a displacement amount in a second direction between positions in the first viewpoint image and the second viewpoint image corresponding to a same position in a shooting range, the displacement amount varying in conformity with a parallax amount between the positions, the second direction being perpendicular to the first direction; selecting, in the first viewpoint image, a base region corresponding to a base position of parallax amount detection; performing correlation calculation processing with respect to each of a plurality of reference regions corresponding to a plurality of reference positions in the second viewpoint image, the correlation calculation processing including first correction processing and calculation processing, the first correction processing correcting at least one of a position of the base region in the second direction and a position of the reference region in the second direction based on the displacement information so as to reduce a displacement that occurs between the base position and the reference position in the second direction and that is in conformity with a parallax amount between the base position and the reference position, the calculation processing calculating a correlation between the base region and the reference region that reflect the first correction processing; and detecting a parallax amount at the base position based on each correlation between the base region and each of the plurality of reference regions.

According to a fourth aspect of the present invention, there is provided a non-transitory computer-readable storage medium which stores a program for causing a computer to execute a parallax detecting method comprising: obtaining a first viewpoint image and a second viewpoint image that have different viewpoints from each other in a first direction; obtaining displacement information that specifies a displacement amount in a second direction between positions in the first viewpoint image and the second viewpoint image corresponding to a same position in a shooting range, the displacement amount varying in conformity with a parallax amount between the positions, the second direction being perpendicular to the first direction; selecting, in the first viewpoint image, a base region corresponding to a base position of parallax amount detection; performing correlation calculation processing with respect to each of a plurality of reference regions corresponding to a plurality of reference positions in the second viewpoint image, the correlation calculation processing including first correction processing and calculation processing, the first correction processing correcting at least one of a position of the base region in the second direction and a position of the reference region in the second direction based on the displacement information so as to reduce a displacement that occurs between the base position and the reference position in the second direction and that is in conformity with a parallax amount between the base position and the reference position, the calculation processing calculating a correlation between the base region and the reference region that reflect the first correction processing; and detecting a parallax amount at the base position based on each correlation between the base region and each of the plurality of reference regions.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<<Configuration of Parallax Detecting Apparatus 100>>

Figure 1:
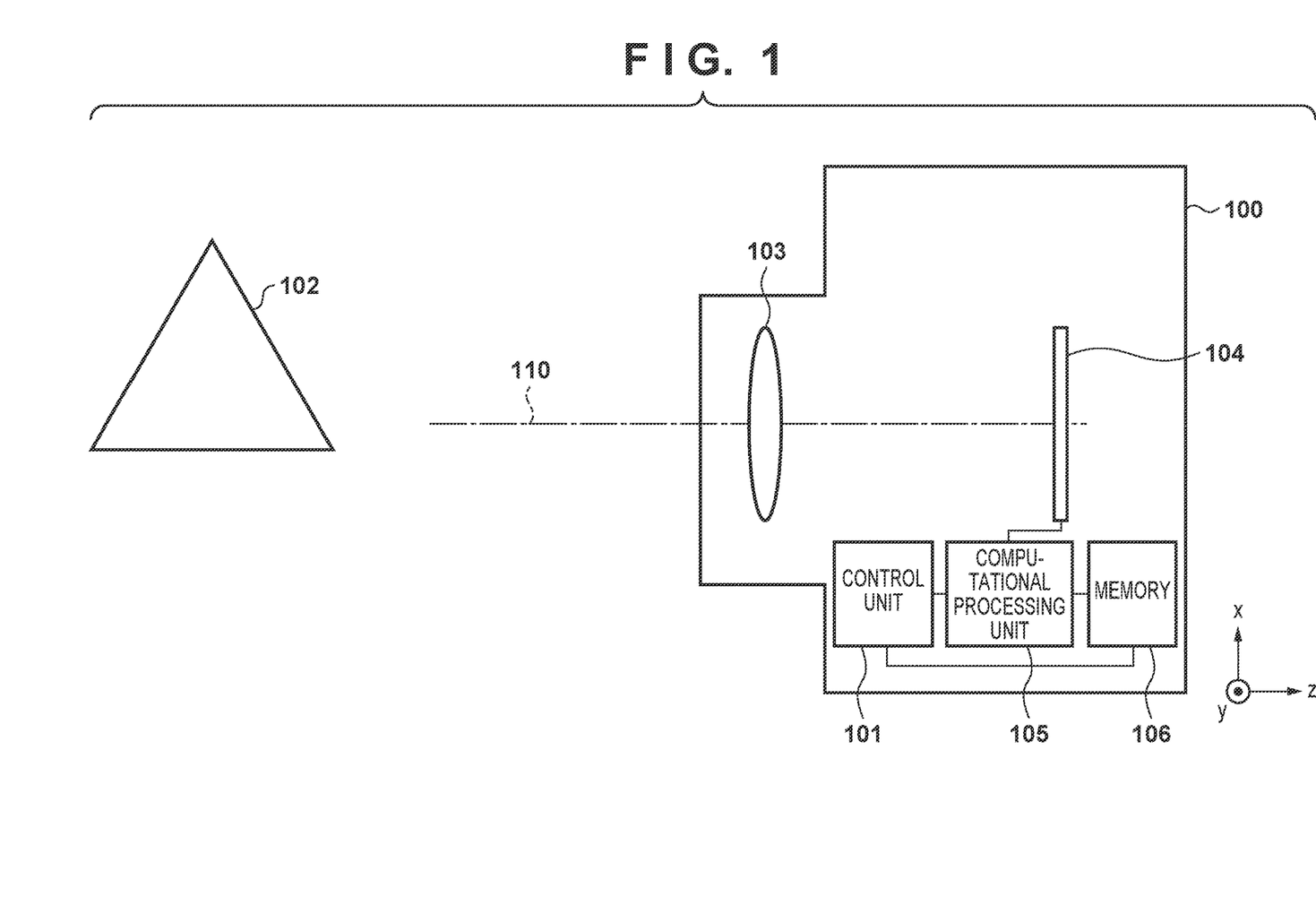
FIG. 1 is a schematic block diagram of a parallax detecting apparatus 100.

FIG. 1 is a schematic block diagram of a parallax detecting apparatus 100. Although the following describes a case where the parallax detecting apparatus 100 is an image capturing apparatus as an example, the parallax detecting apparatus 100 may be another apparatus, such as a personal computer.

The parallax detecting apparatus 100 includes a control unit 101, an image forming optical system 103, an image sensor 104, a computational processing unit 105, and a memory 106, and is configured to shoot a subject 102 using the image forming optical system 103 and the image sensor 104.

The control unit 101 includes a nonvolatile memory that stores a control program, and that controls respective components of the parallax detecting apparatus 100 in accordance with the control program. The control unit 101 uses the memory 106 as a working memory in executing the control program.

The image forming optical system 103 has a function of forming an image of the subject on the image sensor 104, which is an image capturing surface. The image forming optical system 103 is composed of a group of a plurality of lenses (not shown) and a diaphragm (not shown), and has an exit pupil at a position that is away from the image sensor 104 by a predetermined distance. An optical axis 110 is an optical axis of the image forming optical system 103. In the present specification, it is assumed that the optical axis 110 is parallel to the z-axis. Furthermore, the x-axis and the y-axis are perpendicular to each other, and are also perpendicular to the z-axis (optical axis 110).

Figure 2A:
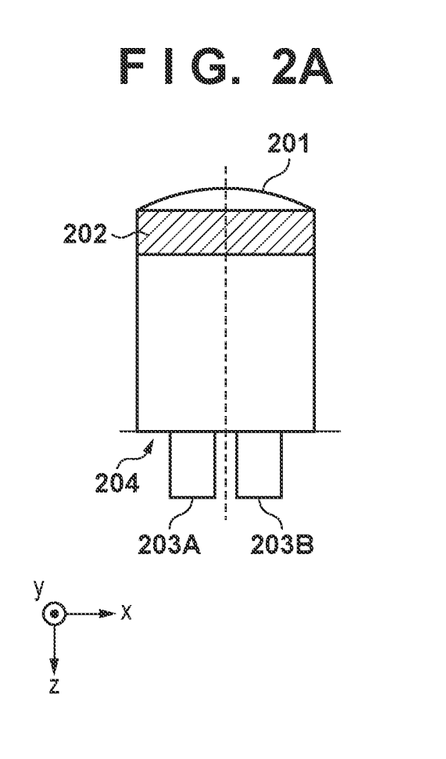
FIGS. 2A and 2B are diagrams illustrating a configuration of pixels of an image sensor 104 according to a first embodiment.
Figure 2B:
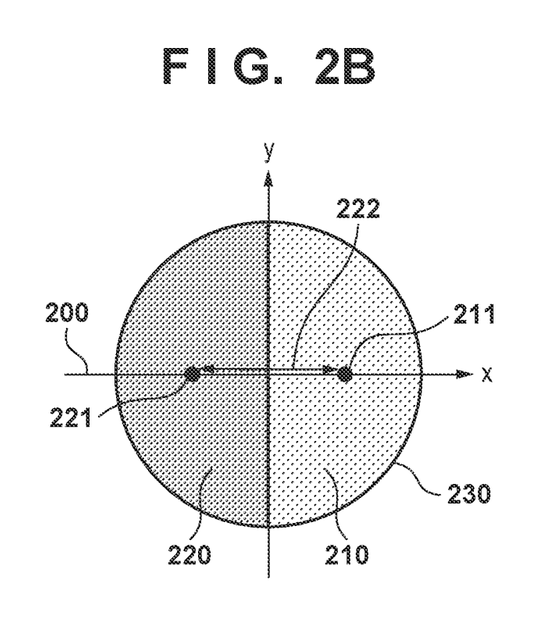

A description is now given of a configuration of pixels of the image sensor 104 with reference to FIGS. 2A and 2B. A plurality of pixels are arranged in the image sensor 104. As shown in a cross-sectional view of FIG. 2A, each pixel includes a microlens 201, a color filter 202, and photoelectric conversion units 203A, 203B. In the image sensor 104, each pixel is given, by the color filter 202, spectral characteristics of R, G, or B (Red, Green, or Blue) in conformity with the wavelength band detected by the pixel, and respective pixels are arranged based on a known color scheme pattern (not shown). Although the description of the present specification is given under the assumption that respective pixels are arranged on an xy plane, respective pixels need not necessarily be arranged on the xy plane. The photoelectric conversion units 203A, 203B have a sensitivity in the detected wavelength band, and are formed on a substrate 204. Furthermore, each pixel includes non-illustrated wires.

FIG. 2B is a diagram of the exit pupil of the image forming optical system 103 as viewed from an intersection between the optical axis 110 and the image sensor 104 (the central image height). First light beams that have mainly passed through a first pupil region 210 and second light beams that have mainly passed through a second pupil region 220 are incident on the photoelectric conversion unit 203A and the photoelectric conversion unit 203B, respectively. The first pupil region 210 and the second pupil region 220 are different regions of the exit pupil. An A image and a B image are generated by photoelectrically converting the light beams incident on the photoelectric conversion unit 203A and the photoelectric conversion unit 203B, respectively. The generated A image and B image are transmitted to the computational processing unit 105. The computational processing unit 105 calculates, for example, a parallax value or a distance value through computational processing based on the A image and the B image, and stores the calculation result into the memory 106. Furthermore, an image obtained by adding A images and B images can be used as an image for recording purpose (viewing purpose).

In FIG. 2B, a first center-of-mass position 211 is the position of the center of mass of the first pupil region 210, and a second center-of-mass position 221 is the position of the center of mass of the second pupil region 220. In the present embodiment, the first center-of-mass position 211 has been decentered (moved) from the center of the exit pupil along the x-axis 200. On the other hand, the second center-of-mass position 221 has been decentered (moved) in the direction opposite from the first center-of-mass position 211 along the x-axis 200. The direction connecting between the first center-of-mass position 211 and the second center-of-mass position 221 is referred to as a pupil division direction. Furthermore, the distance between the centers of masses, namely the first center-of-mass position 211 and the second center-of-mass position 221, is a base-line length 222.

As a result of defocus, the A image and the B image change in position in the same direction as the pupil division direction (in the present embodiment, the x-axis direction). The amount of this relative positional change between the images, that is to say, the parallax amount between the A image and the B image is an amount that is in conformity with a defocus amount. Therefore, once this parallax amount has been obtained using a later-described method, the parallax amount can be converted into the defocus amount or distance using a known conversion method.

At this time, one of possible causes of the displacement in the direction perpendicular to the parallax direction (in the figure, the Y direction; hereinafter referred to as the Y direction) is the displacement of the positions of the centers of mass of respective divided pupils in the Y direction. Hereinafter, this displacement in the Y direction is referred to as a Y displacement, and the amount thereof is referred to as a Y displacement amount. For example, if the optical system has been subjected to aberration and the like in such a manner that the first center-of-mass position 211 is located in the positive direction of the Y direction and the second center-of-mass position 221 is located in the negative direction of the Y direction, there is a displacement in the Y direction also at the image forming position. Furthermore, when the first center-of-mass position 211 and the second center-of-mass position 221 are not symmetrical in the Y direction with respect to the center of the pupil 230, there is a displacement in the Y direction also at a distance position with a parallax of 0.

<<Parallax Detecting Processing>>

Figure 3:
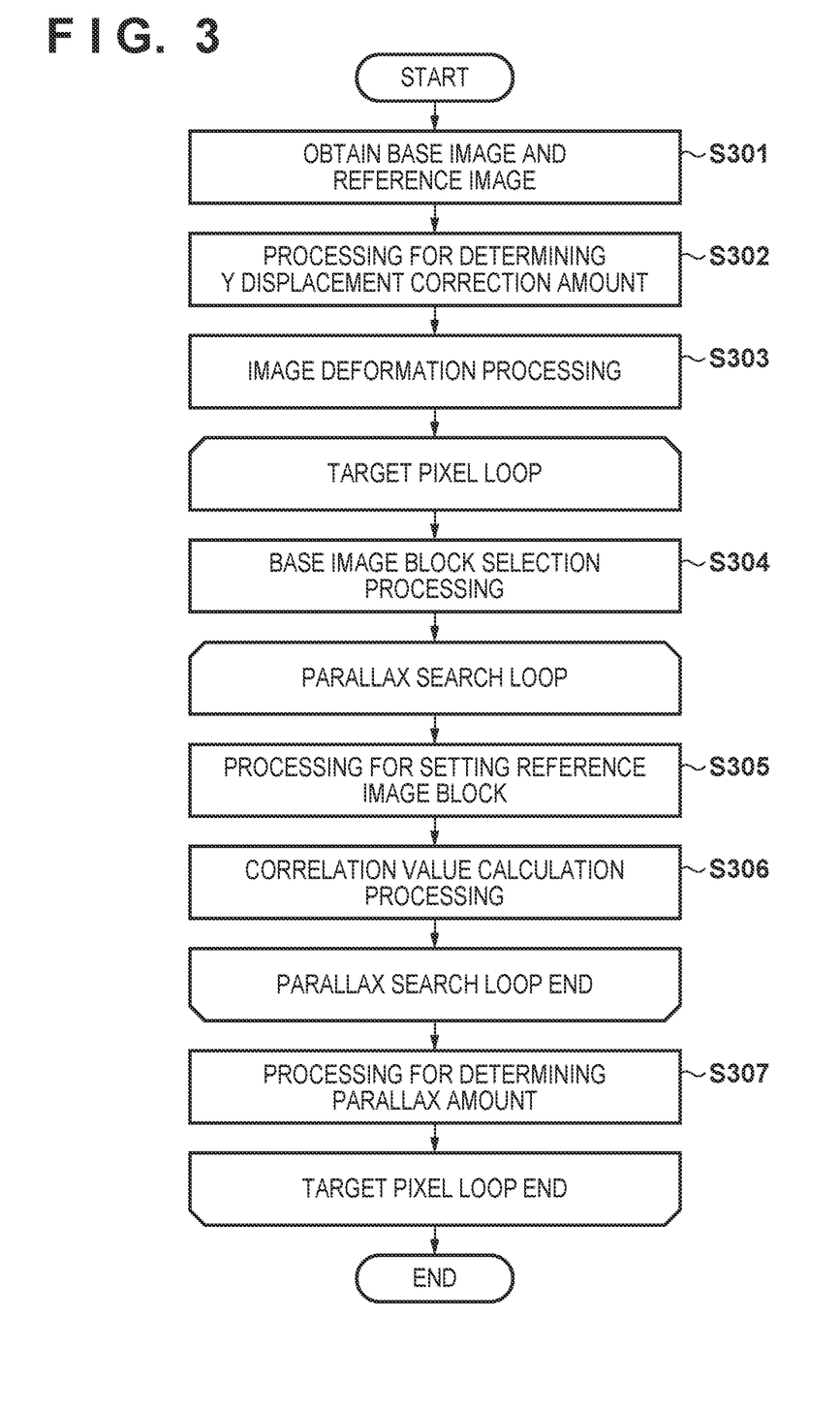
FIG. 3 is a flowchart of parallax detecting processing performed by the parallax detecting apparatus 100.

FIG. 3 is a flowchart of parallax detecting processing performed by the parallax detecting apparatus 100. Processing of each step of the present flowchart is realized by the control unit 101 controlling respective components of the parallax detecting apparatus 100 in accordance with the control program, unless specifically stated otherwise.

In step S301, the control unit 101 obtains an image set composed of an A image and a B image (a first viewpoint image and a second viewpoint image) that are different in parallax from each other in the X direction (the first direction) by shooting the subject 102, and stores the image set into the memory 106. In the following description, it is assumed that the A image is used as a base image, and the B image is used as a reference image. The base image is an image in which pixel positions correspond to parallax information to be output. Note that there is no particular limitation on which one of the A image and the B image is used as the base image.

In step S302, the computational processing unit 105 determines a Y displacement correction amount that is used in later-described steps S303 and S305. It is assumed that the amount of change in the Y displacement amount relative to parallax is known. This may be, for example, calculated through a simulation and the like based on design values. At this time, it is desirable that the calculation be performed based on design values that take into consideration the influence of heat and the influence of individual differences arising from manufacturing errors and the like. The result of shooting a chart and the like and measuring the same in advance may also be used. For example, by using a point image chart as a subject and measuring the positions of a point image in the base image and the reference image, a Y displacement amount corresponding to a certain parallax amount can be calculated. By changing the distance of the chart and performing the measurement multiple times, the amount of change in the Y displacement amount relative to a change in the parallax amount can be obtained. The used chart is not limited to the point image chart, and may be any chart, such as a bar chart (diagonal lines or horizontal lines) and a circle chart. Information of the Y displacement amount is stored in, for example, the nonvolatile memory of the control unit 101, and is read out in step S302 as necessary.

Figure 4:
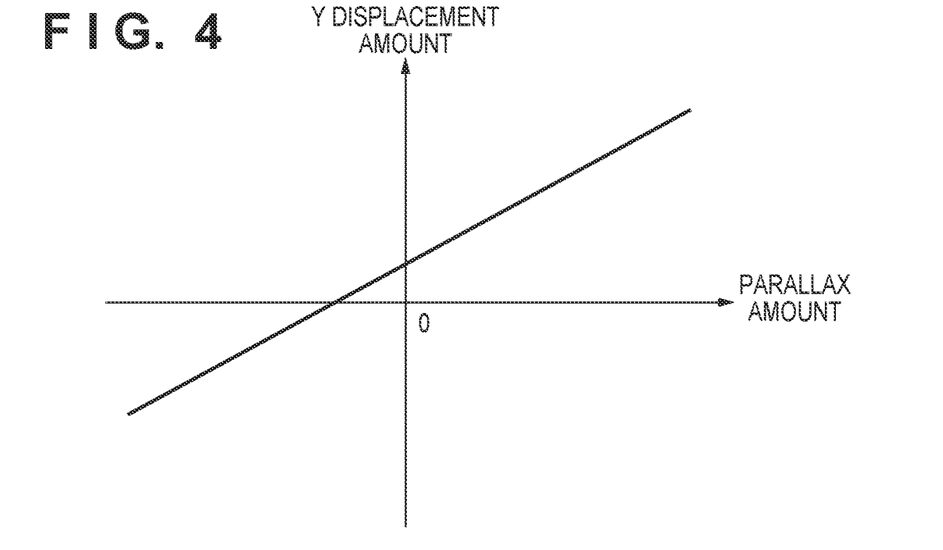
FIG. 4 is a diagram illustrating an example of an amount of change in a Y displacement amount relative to parallax.

A description is now given of an example of the amount of change in the Y displacement amount relative to parallax with reference to FIG. 4. In FIG. 4, a horizontal axis corresponds to the parallax amount, and a vertical axis corresponds to the Y displacement amount. As can be understood from FIG. 4, the displacement amount in the Y direction (the second direction) between positions in the base image and the reference image corresponding to the same position in a shooting range varies in conformity with the parallax amount between these positions. Furthermore, in the example of FIG. 4, the relationship between parallax and the Y displacement amount can be specified by storing the inclination of the straight line and the Y intercept. That is to say, the control unit 101 may store information that indicates the inclination and the intercept in a graph with a horizontal axis representing the parallax amount and a vertical axis representing the displacement amount into the nonvolatile memory of the control unit 101 as displacement information that specifies the Y displacement amount.

Note that regarding the storage of the amount of change in the Y displacement amount relative to parallax and the corresponding correction amount, they may be stored on a per-pixel basis, or may be stored on a per-length basis using an actual length on an image plane. In general, the amount of change in the Y displacement amount relative to parallax varies with each image height; thus, by storing information indicating the relationship between the parallax amount and the Y displacement amount on a per-image height basis, the parallax amount can be calculated with high accuracy for any image height. The details of processing for determining the Y displacement correction amount in step S302 will be described later.

Referring to FIG. 3 again, in step S303, the computational processing unit 105 performs image deformation processing in accordance with the correction amount determined in step S302. The computational processing unit 105 deforms at least one of the base image and the reference image in accordance with the Y displacement amount between the base image and the reference image (performs second correction processing for correcting the position(s) in the second direction), thereby reducing the Y displacement amount.

Figure 5:
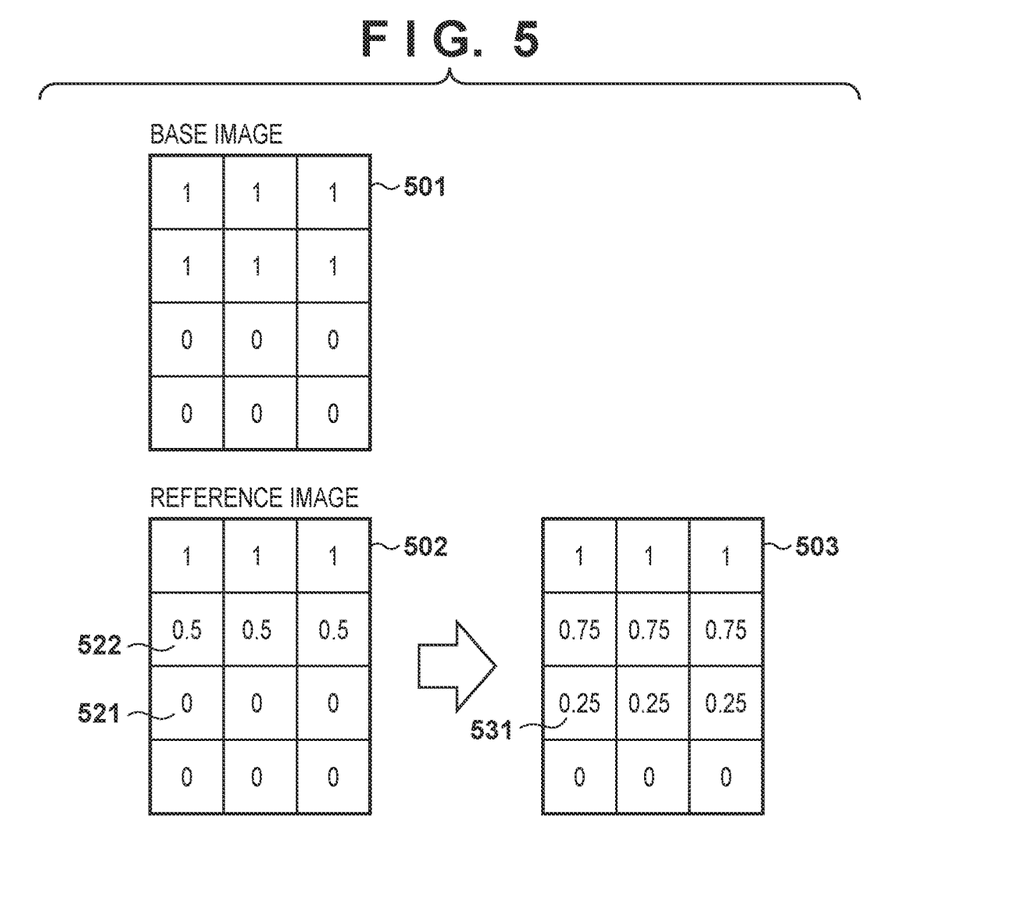
FIG. 5 is a diagram showing an example of image deformation processing in step S303 of FIG. 3.

FIG. 5 is a diagram showing an example of the image deformation processing in step S303 of FIG. 3. FIG. 5 shows some of pixels in a base image 501 and a reference image 502. The numeral in each pixel indicates a pixel value. It is assumed that in the example of FIG. 5, the reference image 502 has been subjected to a Y displacement of +0.5 pixels relative to the base image 501. In this case, the computational processing unit 105 generates a deformed reference image 503 by deforming the reference image 502 by −0.5 pixels so as to correct (cancel out) the Y displacement amount. Specifically, the computational processing unit 105 deforms the reference image 502 by performing linear interpolation based on upper and lower pixels (a plurality of pixel values that are continuous in the Y direction) in the reference image 502. For example, for a pixel 521 in the reference image 502, a pixel 531 having a pixel value of 0.25 in the deformed reference image 503 is obtained through linear interpolation based on the pixels 521 and 522, which are two pixel values that are continuous in the Y direction ((0+0.5)/2).

In this way, even when the number of pixels corresponding to the Y displacement correction amount is not an integer (i.e., when a post-correction pixel position in a correction target image is displaced from a pre-correction pixel position in the correction target image), a post-correction pixels value in the correction target image can be calculated by performing interpolation computation.

Note that the interpolation method is not limited to linear interpolation, and the interpolation method that uses a large number of nearby pixels may be adopted. For example, an arbitrary interpolation method, such as bicubic interpolation, can be adopted. Although FIG. 5 shows some of pixels, in practice, deformation is performed with respect to all pixels for which the correction amount is provided. As stated earlier, as the correction amount varies with each image height, there is a possibility that the correction amount changes on a per-pixel basis. In this case also, the image is deformed by performing interpolation processing while changing the correction amount from a nearby pixel. With linear interpolation, deformation that is in conformity with the correction amount can be realized by changing the weights of upper and lower pixels in accordance with the correction amount.

Incidentally, while the Y displacement correction is performed by deforming only the reference image in the example of FIG. 5, this case leaves a large difference attributed to interpolation between the base image and the reference image, thereby causing the occurrence of an error in the detected parallax amount. In view of this, the error can be reduced by deforming both of the base image and the reference image. Specifically, when the reference image has been subjected to a Y displacement of +0.5 pixels relative to the base image, the Y displacement amount can be corrected by deforming the base image and the reference image by +0.25 pixels and by −0.25 pixels, respectively. In this way, the level of the influence of interpolation is the same in the base image and the reference image, and the error can be reduced accordingly.

Reference is made to FIG. 3 again. Processing of steps S304 to S307 (processing of a target pixel loop) is executed repeatedly until the processing is completed with respect to every target pixel (a pixel at a base position for parallax amount detection). In step S304, the computational processing unit 105 selects a base image block (a base region corresponding to a base position).

Figure 6A:
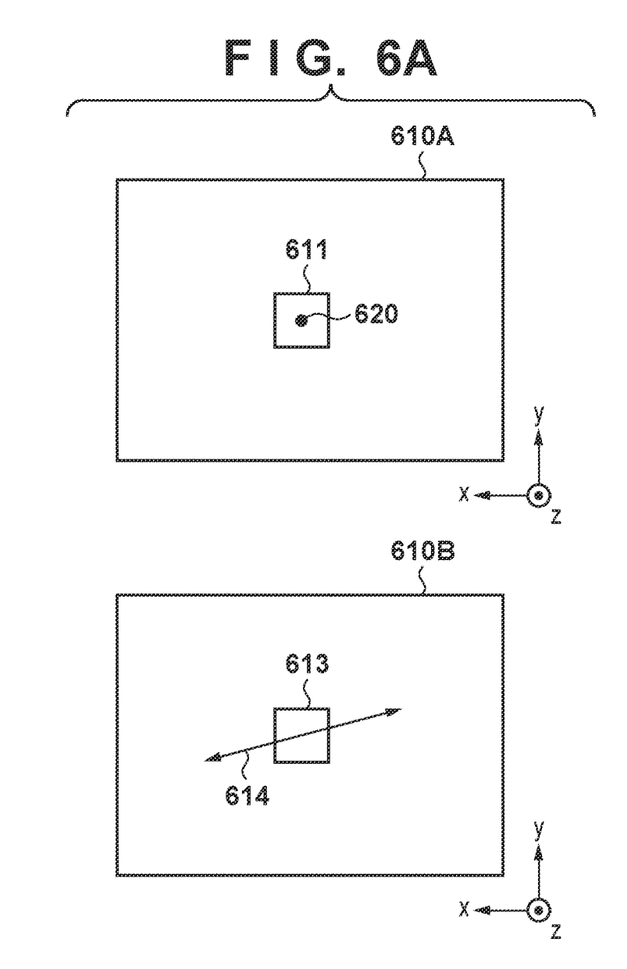
FIG. 6A is a diagram showing a positional relationship between a base image and a reference image.

FIG. 6A is a diagram showing a positional relationship between a base image and a reference image. FIG. 6A shows a base image 610A and a reference image 610B. The computational processing unit 105 extracts a partial region including a pixel for which parallax calculation is to be performed (a target pixel 620) and nearby pixels in the base image 610A, and uses the same as a base image block 611. Although the base image block 611 is indicated by a rectangle in FIG. 6A, the base image block may not be a rectangle. Multiple target pixels are selected while changing the position in the base image 610A in accordance with the number of pixels in the final output result (e.g., a parallax image or a distance image).

Referring to FIG. 3 again, processing of steps S305 and S306 (processing of a parallax search loop) is executed repeatedly until the processing is completed with respect to an entire parallax search range. In step S305, the computational processing unit 105 sets a reference image block (a reference region corresponding to a reference position). As stated earlier with reference to FIG. 4, the variation in the Y displacement amount is dependent on the parallax amount. A displacement between the base image block and the reference image block in the X direction is equivalent to parallax. Provided that a range of the expected amounts of change in parallax is the parallax search range, the computational processing unit 105 calculates costs for respective parallax amounts within the parallax search range in later-described step S306. At this time, as the Y displacement amount changes relative to parallax, it is necessary to set the reference image block with the corrected Y displacement amount. The reference image block is set in accordance with parallax. For example, assume a case where the reference image block is set at a position with a parallax of one pixel. In this case, a position obtained by moving, by one pixel in the X direction, a position in the reference image that is equivalent to the target pixel position (base position) in the base image is used as a target pixel (reference position) of the reference image block at the position with a parallax of one pixel. The reference image block is generated in the same form as the base image block.

Figure 6B:
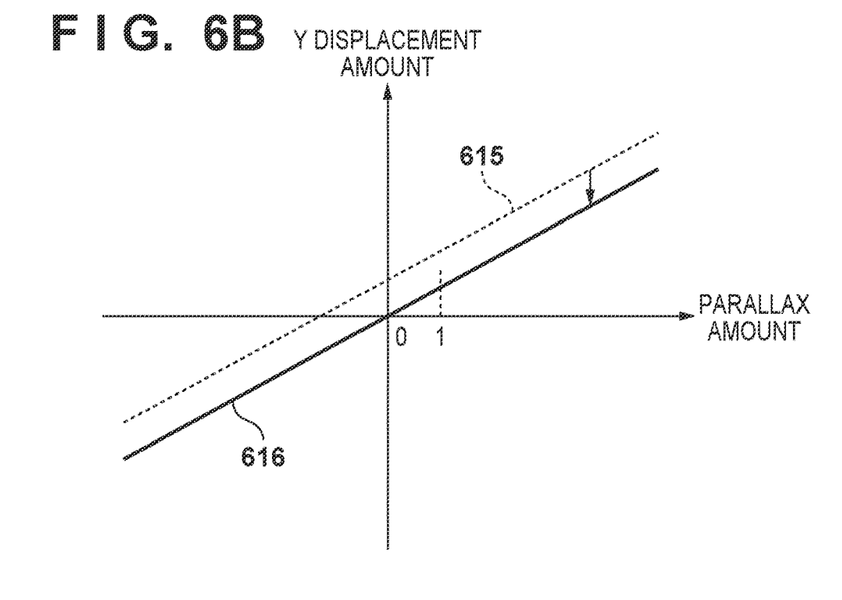
FIG. 6B is a diagram showing a Y displacement amount 615 that is dependent on a parallax amount at a target pixel, and a Y displacement amount 616 that remains after a reference image is corrected (deformed) in step S303.

FIG. 6B is a diagram showing a Y displacement amount 615 that is dependent on the parallax amount at the target pixel, and a Y displacement amount 616 that remains after the reference image is corrected (deformed) in step S303. A case where correction has been performed to achieve a Y displacement amount of 0 at a position corresponding to a specific parallax amount (in the present example, a parallax amount of 0 pixels) is shown as an example of the correction in step S303. In a position corresponding to a parallax amount of 1 pixel, the Y displacement amount is not 0, and thus the reference image block needs to be corrected. As shown in the reference image 610B in FIG. 6A, a target pixel of a reference image block 613 is set diagonally in the reference image 610B as indicated by an arrow 614. In setting the reference image block with the Y displacement amount taken into consideration, it is necessary to generate a block that is displaced in the Y direction in the subpixel order relative to the original image position. Similarly to processing of step S303, the reference image block that takes into consideration the Y displacement amount in the subpixel order can be set by performing interpolation processing that uses nearby pixels.

Figure 6C:
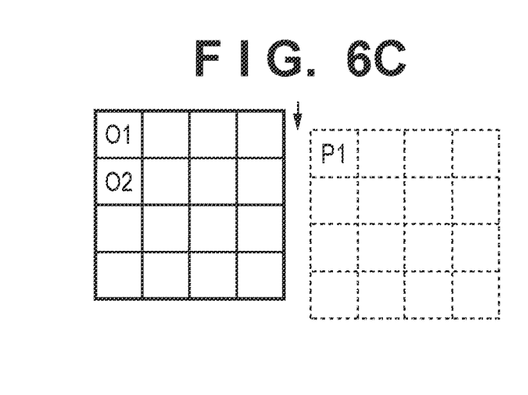
FIG. 6C is a diagram illustrating a specific example of the setting of a reference image block.

A description is now given of a specific example of the setting of a reference image block with reference to FIG. 6C. FIG. 6C shows a reference image block with 4×4 pixels. The portions with solid lines represent original pixels of the reference image 610B, with O1 and O2 representing pixel values at the relevant pixel positions. Portions with dash lines represent the reference image block of a case where correction based on the correction amount for the Y displacement amount has been performed, that is to say, the positions in the Y direction have been corrected (displaced), with P1 representing a pixel value at the relevant pixel position. In this case, the pixel value P1 of the reference image block of the case where the Y displacement amount has been corrected can be calculated by calculating a weighted average value dependent on the Y displacement amount with respect to the pixel value O1 and the pixel value O2. The reference image block can be set by performing similar calculation with respect to all of the pixels within the reference image block.

If the parallax amount changes, the reference image block corresponding to the base image block moves in the X direction, and the Y displacement amount changes as well. Therefore, the weight used in interpolation processing for the reference image block also changes. Furthermore, if the position of the target pixel in the base image changes, there is a possibility that the relationship between the parallax amount and the Y displacement amount changes as well; in this case also, the weight changes. In the case of FIG. 6B, information of the inclination of the straight line and the Y intercept becomes necessary in step S305. This information is the correction amount determined in step S302.

Note that with respect to the base image block also, the base image block that has been displaced in the Y direction in accordance with the movement of the target pixel in the reference image block can be generated, similarly to the processing for setting the reference image block in step S305. That is to say, the computational processing unit 105 can reduce the Y displacement between the target pixel (base position) in the base image block and the target pixel (reference position) in the reference image block by correcting the position of at least one of the base image block and the reference image block in the Y direction also in the correction processing (second correction processing) in step S305, similarly to the correction processing in step S303. In this case, the correction amount for the base image block (the amount of displacement in the Y direction) is determined based on the correction amount for the whole (the correction amount determined in the S302) and on the correction amount for the reference image block. Based on the correction amount for the base image block, the weight for weighted averaging of nearby pixels is determined. In this way, even when the number of pixels corresponding to the Y displacement correction amount is not an integer (i.e., when a post-correction pixel positions in a correction target image block (correction target region) is displaced from a pixel position in the base image or the reference image including the correction target image block), a post-correction pixels value in the correction target image block can be calculated by performing interpolation computation.

In step S306, the computational processing unit 105 calculates a correlation value between the base image block selected in step S304 and the reference image block set in step S305. In calculating the correlation value, such general calculation methods as an SAD (Sum of Absolute Differences) representing a sum of absolute values of differences, an SSD (Sum of Squared Differences) representing a sum of squares of differences, and a normalized cross correlation can be used. Furthermore, the correlation value may be calculated using the Hamming distance after applying the transformation called the CENSUS transform to the image(s).

Incidentally, in the image deformation processing of step S303, a structural difference attributed to interpolation may arise between the base image and the reference image, and a parallax error called pixel locking may occur. Pixel locking occurs when calculation is performed with the subpixel accuracy. The influence of pixel locking can be reduced when the SSD or the normalized cross correlation is used compared to when the SAD is used. Furthermore, the accuracy can be improved also by using an error reduction method called EEC (Estimation Error Cancel).

In the case of the SAD, the computational processing unit 105 calculates the absolute values of differences in step S306. By combining the Y displacement correction in step S305 and the computation of the correlation value in step S306 into one expression, the absolute values of differences AD can be obtained using the following expression (1).

$$AD = |Aij - \{(1-b)Bkl + bBkm\}| \quad (1)$$

Here, Aij represents a pixel that is $i^{th}$ in the X direction and $j^{th}$ in the Y direction in the base image. Bkl and Bkm represent pixels that are $k^{th}$ in the X direction and $l^{th}$ and $m^{th}$, respectively, in the Y direction in the reference image. Also, b is equivalent to the weight for calculating the weighted average value of the reference image corresponding to the correction amount calculated from the Y displacement amount in step S305. In the case of the example of FIG. 6C (e.g., when the pixel values O1, O2 are used), Bkl and Bkm neighbor each other in the vertical direction, and l=m+1.

Once developed and organized, expression (1) can be represented as the following expression (2).

$$AD = |Aij - Bkl + b(Bkl - Bkm)| \quad (2)$$

In expression (2), with regard to Aij−Bkl in the first term and Bkl−Bkm, which is a difference portion, in the second term within the absolute value, the same calculation is required many times, that is to say, each time the target pixel of the reference image and the target pixel of the base image change. Therefore, the amount of calculation can be significantly reduced by calculating these two terms and storing the calculation result into the memory 106 before the processing for setting the reference image block is performed, and by reading out the calculated values stored in the memory 106 in the processing for setting the reference image block.

Furthermore, when correction is performed also with respect to the base image block, the amount of calculation can be reduced by calculating Aij−Aip (j=p+1) as well and storing the calculation result in advance. In other words, with respect to at least one of the base image and the reference image, the computational processing unit 105 calculates a pixel difference value representing a difference between two pixel values for each of a plurality of combinations of two pixel values that are continuous in the Y direction, and records the calculated pixel difference value into the memory 106. Then, in the correction processing of step S305, when linear interpolation computation based on two pixel values corresponding to the pixel difference value recorded in the memory 106 is performed, the computational processing unit 105 performs linear interpolation computation using this recorded pixel difference value.

In step S307, the computational processing unit 105 determines (detects) a parallax amount based on the correlation values obtained in step S306. The parallax amount can be determined using an existing method. For example, the parallax amount can be determined by extracting a data string of correlation values corresponding to a movement amount (a displacement between the base image block and the reference image block in the X direction) with which the highest correlation among the correlation values is obtained and nearby movement amounts, and by estimating the movement amount with the highest correlation with the subpixel accuracy using a known interpolation method. For example, when the SADs are used in calculating the correlation values, equiangular straight line fitting can be used as a known interpolation method. Meanwhile, when the SSDs are used in calculating the correlation values, parabola fitting can be used as a known interpolation method. A variety of interpolation methods are possible depending on the method of calculation of the correlation values; the parallax amount with the subpixel accuracy may be determined (calculated) using any interpolation method.

A parallax image with parallax values at a plurality of image height positions can be obtained by repeating the processing while changing the target pixel (base position) in the base image in the target pixel loop (steps S304 to S307). Furthermore, in the processing for determining the parallax amount, not only the parallax amount but also defocus information and subject distance information may be calculated. The parallax amount can be converted into a defocus amount based on a geometric relationship using the baseline length. Furthermore, the defocus amount can be converted into the subject distance using an image formation relationship in the image forming optical system 103.

<<Details of Processing for Determining Y Displacement Correction Amount (Step S302)>>

In the processing for determining the Y displacement correction amount in step S302, the computational processing unit 105 determines how to correct the Y displacement amount (how to share the correction) in steps S303 and S305. In the example of FIG. 6B, in step S303, the computational processing unit 105 performs correction so as to reduce the Y displacement amount (to 0 in the present case) when the parallax amount is 0. With this correction that achieves a specific value as the Y displacement amount when the parallax amount is 0, the information required in step S305 is only the inclination of the relationship between the parallax amount and the Y displacement amount. Therefore, the amount of information held as parameters and the amount of memory access can be reduced.

Also, in the pixel configuration of FIGS. 2A and 2B, it is highly likely that a parallax amount of 0 is in the vicinity of the focus position of the image forming optical system 103 in FIG. 1, and is a central distance in ranging. Furthermore, the location of the parallax amount (specific parallax amount) corresponding to a Y displacement amount of 0 is related to achieving a Y displacement amount of 0 in the case of a specific distance. By setting a Y displacement amount of 0 at the distance positions in which the subject distance to be measured exists with high frequency, the Y displacement correction amount in step S305 can be reduced for the majority of target pixels. That is to say, the computational processing unit 105 can determine the specific parallax amount that reduces the Y displacement amount based on the frequency of occurrence of the parallax amount in the shooting range. When performing processing for carrying out the parallax search in order from the vicinity of parallax with a high frequency of occurrence and terminating the parallax search halfway through if the correlation value is high, the amount of access to the reference image in the Y direction during the setting of the reference image block can be reduced, and calculation can be performed efficiently.

The Y displacement amount is large on an edge of the search range (mainly when the absolute value of the parallax amount is large). When the Y displacement amount is large, pixel values within the reference image that are more distanced from the target pixel in the Y direction are required; thus, making the Y displacement amount as small as possible reduces the range of memory access and improves the calculation efficiency. Therefore, by setting a Y displacement amount of 0 for a parallax value at the center of the search range, efficient processing can be performed.

Furthermore, before obtaining the base image and the reference image in step S301, the computational processing unit 105 may calculate correction amounts for steps S303 and S305 and store them into, for example, the memory 106. In this case, processing of step S302 is not performed after the base image and the reference image are obtained; the computational processing unit 105 can read out the correction amounts that are respectively necessary in steps S303 and S305 from the memory 106, and perform correction in respective steps.

<<Parallax Detecting Processing for Case where Y Displacement Amount Varies>>

Incidentally, there is a possibility that the Y displacement amount varies due to the influence of heat, vibration, and the like during operation. In this case, it is necessary to calculate the Y displacement amount after the base image and the reference image are obtained in step S301.

Figure 7:
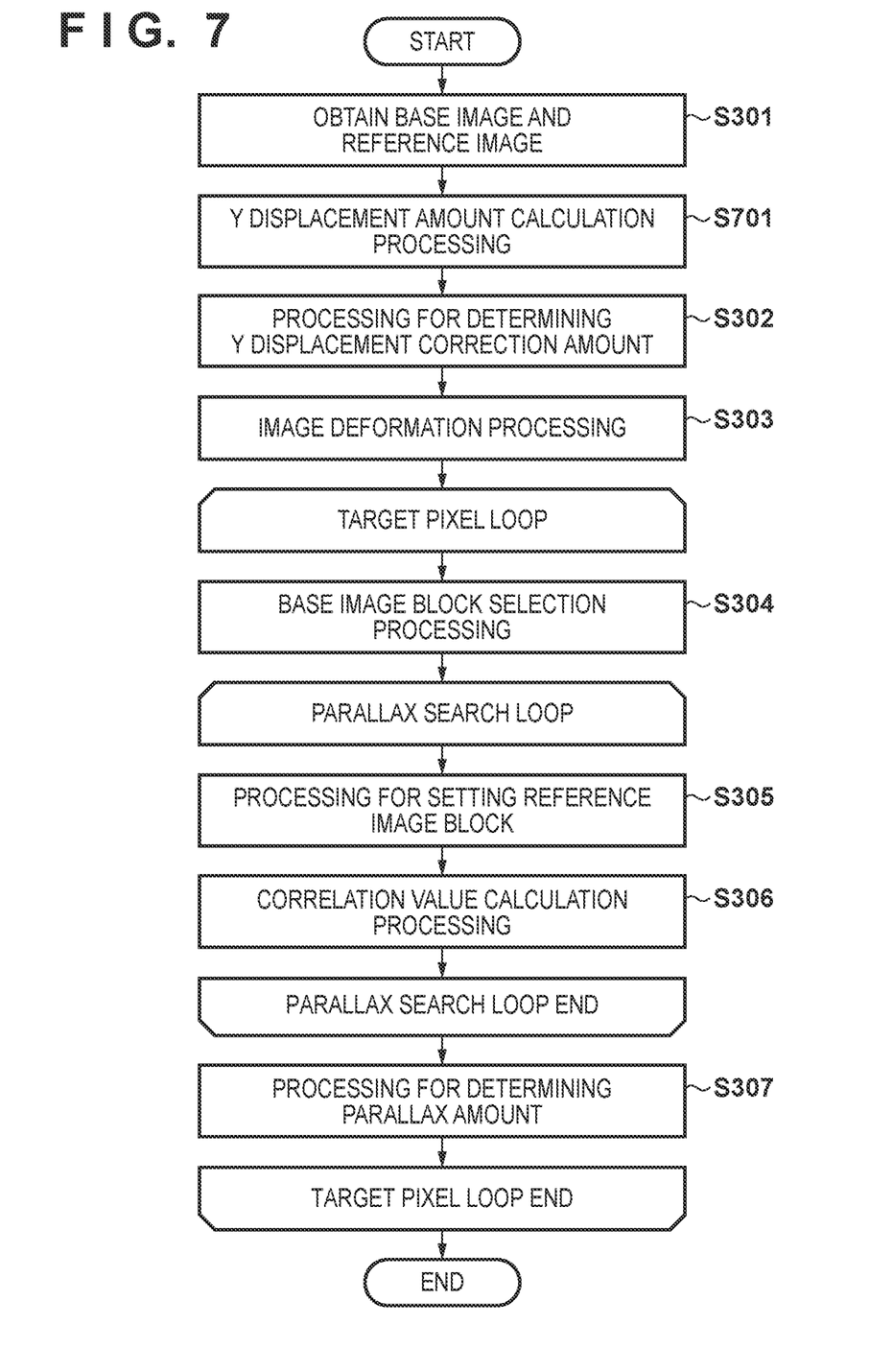
FIG. 7 is a flowchart of parallax detecting processing for a case where a Y displacement amount varies.

FIG. 7 is a flowchart of parallax detecting processing for a case where the Y displacement amount varies. Processing of each step of the present flowchart is realized by the control unit 101 controlling respective components of the parallax detecting apparatus 100 in accordance with the control program, unless specifically stated otherwise. Furthermore, in the present flowchart, steps that perform processing that is the same or similar to processing of FIG. 3 are given the same reference signs as in FIG. 3.

After the base image and the reference image are obtained in step S301, the computational processing unit 105 performs processing for calculating the Y displacement amount in step S701. For example, the computational processing unit 105 calculates the relationship between the parallax amount and the Y displacement amount by, for example, conducting a search (conducting a two-dimensional search) in the two-dimensional direction (X direction and Y direction) between the obtained base image and reference image. The calculation need not necessarily be performed with respect to all of the pixels in the obtained images, and the calculation may be performed only with respect to some of the pixels. In this case, with respect to pixels for which the calculation has not been performed, the computational processing unit 105 performs interpolation processing based on the Y displacement amounts for pixels for which the calculation has been performed; in this way, the Y displacement amount can be generated for every pixel.

Furthermore, it is not necessary to always perform the processing for calculating the Y displacement amount (updating of Y displacement information) of step S701 after the images are obtained in step S301; the computational processing unit 105 can perform the processing for calculating the Y displacement amount at a predetermined timing. For example, when images are obtained in chronological order, as with moving images, the processing for calculating the Y displacement amount may be performed at a certain interval. In calculating the relationship between the parallax amount and the Y displacement amount, it is necessary to obtain a plurality of parallaxes and Y displacement amounts at the same pixel position, similarly to the case where the Y displacement amount is obtained in advance. For example, in the case of the relationship shown in FIG. 4, while Y displacement amounts corresponding to at least two parallax values are necessary because it is necessary to calculate the inclination and the Y intercept, only one of them may be changed. Especially when the image sensor 104 has a structure shown in FIGS. 2A and 2B, the same optical system is used for the base image and the reference image, and thus the characteristic of the inclination is that the change in the inclination is small. Therefore, highly accurate parallax computation can be performed by updating only the Y intercept.

As described above, according to the first embodiment, the parallax detecting apparatus 100 selects a base image block, and performs correlation calculation processing with respect to each of a plurality of reference image blocks. The correlation calculation processing includes processing (first correction processing) for correcting at least one of the position of a base image block in the Y direction and the position of a reference image block in the Y direction based on Y displacement information so as to reduce a Y displacement between a base position and a reference position that is in conformity with a parallax amount between a target pixel (base position) in a base image and a target pixel (reference position) in a reference image. The correlation calculation processing also includes calculation processing for calculating the correlation between the base image block and the reference image block that reflect the first correction processing. In this way, the accuracy of parallax amount detection based on the correlations between the images can be improved.

Second Embodiment

Next, a second embodiment will be described. In the present embodiment, a basic configuration of the parallax detecting apparatus 100 is similar to that of the first embodiment (see FIG. 1). The following mainly describes differences from the first embodiment.

Figure 8:
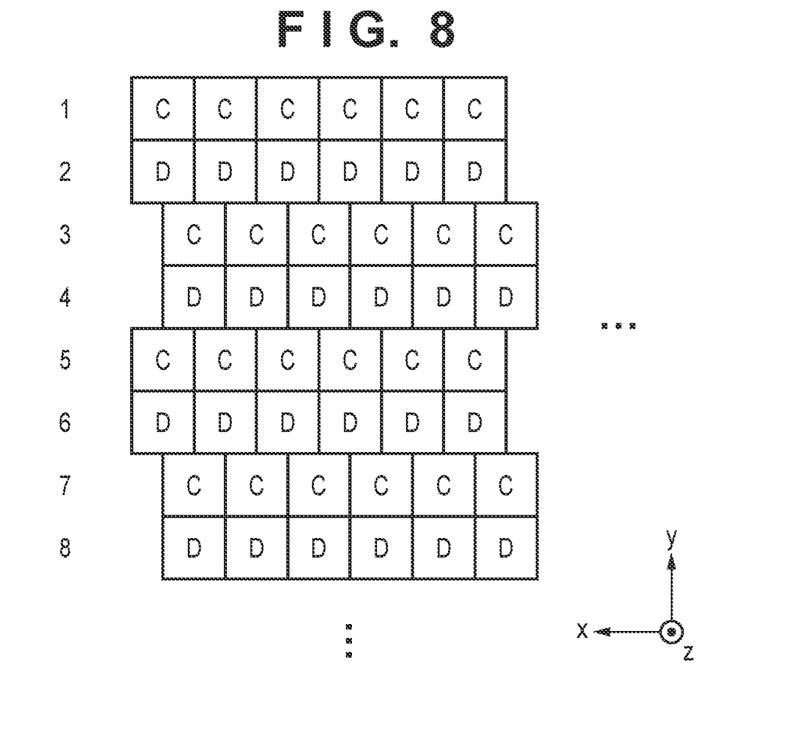
FIG. 8 is a diagram showing a configuration of the image sensor 104 according to a second embodiment.

FIG. 8 is a diagram showing a configuration of the image sensor 104 according to the second embodiment. Note that in the present embodiment, the configuration of the image sensor 104 may be similar to that of the first embodiment (see FIGS. 2A and 2B).

In FIG. 8, pixels C represent color pixels. A color pixel need not necessarily have a plurality of photoelectric conversion units as shown in FIG. 2A, and is given a color filter RGB and spectral characteristics of W (White) with a wide wavelength band. Color pixels may not be used in the aforementioned parallax calculation processing. Pixels D have the aforementioned configuration of FIG. 2A, and perform the aforementioned ranging processing. Furthermore, pixels D may have color filters, and all of them may be given spectral characteristics of W. By thus separating color pixels from ranging pixels on a per-row basis, the total number of all pixels that are output can be reduced, and efficient transmission and calculation can be performed.

In addition, the configuration of FIG. 8 has a displacement of 0.5 pixels in the parallax direction (X direction) every two rows. In this way, the pixel density in the parallax direction can be doubled, and the parallax (ranging) accuracy can be improved approximately twofold. Specifically, a pixel D in the fourth row can be generated from pixels which are included among pixels D in the second row and pixels D in the sixth row and which are in the same column. By adding such processing and performing this processing with respect to all ranging pixels D, pixels that are displaced by 0.5 pixels in the parallax direction of pixels can be generated for all pixels.

A description is now given of parallax detecting processing according to the second embodiment with reference to FIG. 3. Here, differences from the first embodiment will be mainly described. The matters that are not particularly mentioned are similar to the first embodiment.

In step S301, the control unit 101 obtains data of only ranging pixels. A color image may be generated separately using any method. Furthermore, regarding a color image, information of not only pixels C but also pixels D may be used. While a pixel D has two photoelectric conversion units, adding them makes it possible to obtain a signal value with the optical characteristics that are equal to those of a color image.

In processing for determining the Y displacement correction amount in step S302, the computational processing unit 105 need not store the amount of change in the Y displacement relative to parallax and the correction amount calculated therefrom in relation to the pixel positions equivalent to the pixels C. Furthermore, when the Y displacement amount is stored on a per-pixel basis, it is necessary to take into consideration the difference in length on a per-pixel unit between the X direction and the Y direction.

The image deformation processing of step S303 can also be performed simultaneously with interpolation processing that uses 2 pixels in the Y direction among pixels D and that is intended to increase the pixel density in the parallax direction twofold from the configuration having a displacement of 0.5 pixels in the parallax direction (X direction) every two rows. Simultaneous processing is enabled by changing the weight of interpolation processing for pixels D in accordance with the correction amount determined in step S302. The interpolation processing itself is similar to that of the first embodiment. Furthermore, also with respect to the pixel positions in which pixels D already exist, the interpolation processing is performed in accordance with the correction amount. For example, when the correction amount for pixels D in the sixth row corresponds to the positive direction of the Y axis, the image deformation processing is performed through interpolation processing with respect to pixels D in the second row (the same positions in the parallax (X) direction). If the correction amount corresponds to the negative direction, the image deformation processing is performed using pixels D in the tenth row.

As described also in the first embodiment, the influence of an interpolation error can be further reduced by performing the image deformation processing not only with respect to the reference image, but also with respect to the base image. When the image deformation processing is performed with respect to both of the base image and the reference image, their respective correction amounts have a degree of freedom.

Figure 9:
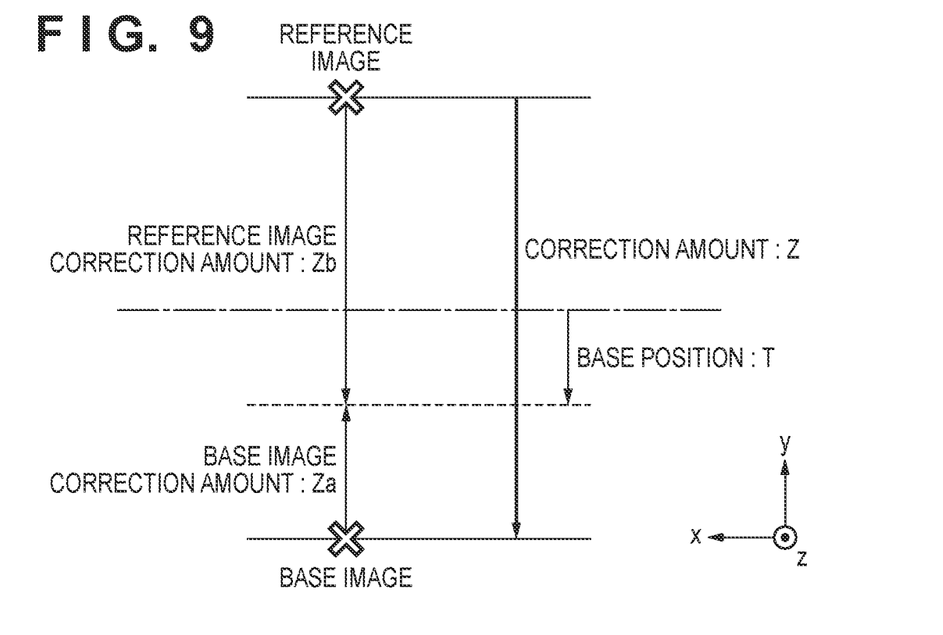
FIG. 9 is a conceptual diagram showing respective correction amounts for a base image and a reference image relative to a correction amount Z.

FIG. 9 is a conceptual diagram showing respective correction amounts for the base image and the reference image relative to a correction amount Z. The correction amount Z is a total, relative correction amount for the reference image relative to the base image. The base image correction amount Za and the reference image correction amount Zb are determined so that the following expression (3) is satisfied.

$$Z=Zb-Za \qquad (3)$$

In determining the image correction amount Za and the reference image correction amount Zb, it is desirable to determine them so that the influence of the interpolation error is minimized while satisfying the restriction of expression (3). As an example, assume that the position corresponding to half of the correction amount Z is 0, and a difference therefrom is T. Provided that T is a base position, Za and Zb can be determined in accordance with the following expressions (4) and (5).

$$Za=T-Z/2 \qquad (4)$$

$$Zb=T+Z/2 \qquad (5)$$

The value of the base position T is determined so that the influence of the interpolation error is minimized. An arbitrary determination method can be used; for example, calculation is performed in advance with respect to a plurality of base positions T, and a value that minimizes the influence of the interpolation error is selected as the final base position T.

For example, in the case of the first embodiment, as an equal interpolation error is achieved by setting the correction amount so that the base image and the reference image move to the opposite sides by the same amount, the value of T that minimizes the influence of the interpolation error is 0. In the arrangement of FIG. 8, provided that the pixel interval in the state of FIG. 8 is converted to 1 pixel, the value of T that minimizes the influence of the interpolation error is ±0.5 pixels.

In this way, the computational processing unit 105 determines the correction amount for the base image and the correction amount for the reference image so as to reduce the influence of the interpolation error (the difference between a correction error in the base image and a correction error in the reference image). The change in the pixel arrangement changes the optimal solution for the relationship between the correction amounts for the base image and the reference image.

Processing of step S304 onward is similar to that of the first embodiment, except that the number of pixels in the base image and the reference image is double in the X direction and ¼ in the Y direction compared to the number of input pixels.

Furthermore, the example of FIG. 8 has been described in relation to the configuration that includes both of the configuration in which color pixels are separated from ranging pixels on a per-row basis (the vertical direction in which they alternate, as opposed to the parallax direction) and the configuration in which they are alternatingly displaced by 0.5 pixels. However, the optimal image deformation processing can be similarly realized also in the case of an image sensor that has one of these two configurations.

As described above, according to the second embodiment, the parallax detecting apparatus 100 determines the correction amount for the base image and the correction amount for the reference image so as to reduce the influence of the interpolation error (the difference between the correction error in the base image and the correction error in the reference image). In this way, the accuracy of parallax amount detection based on the correlations between the images can be improved. Furthermore, when the structure of the image sensor shown in FIG. 8 is used, ranging can be performed with higher accuracy.

Other Embodiments

It is also possible to use a stereo camera composed of two or more, that is to say, a plurality of optical systems and image sensors corresponding thereto as an image capturing apparatus for obtaining a parallax image. This configuration is excellent in terms of improvements in the degree of freedom of design of the base-line length and in the ranging resolution.

The control unit 101 can be configured using a CPU (Central Processing Unit) provided inside the parallax detecting apparatus 100. This configuration is excellent in terms of downsizing of the parallax detecting apparatus 100.

Ranging can be performed with higher accuracy by combining the aforementioned embodiments and a projection apparatus that irradiates a subject with a pattern. For example, projecting a vertical line chart and a random dotted pattern makes it possible to perform ranging even with respect to a region in which a subject has no texture. In the case of the vertical line chart, the influence on the parallax error is small even if there is a Y displacement amount. However, when an image has been distorted or when the projection apparatus and the image capturing apparatus have not been calibrated correctly, the influence is exerted, and thus the Y displacement needs to be corrected.

By calculating a parallax amount in the aforementioned embodiments, processing for, for example, extracting a subject near the in-focus position from an image can be performed. In a digital camera, the obtained parallax amount can be fed back to the image forming optical system 103 and the image sensor 104 and utilized in, for example, an Auto Focus function with higher accuracy. One or both of an optical system control unit and an image sensor control unit, which are not shown, calculates a movement amount corresponding to a correction distance in an arbitrary angle of view, and the optical system or the image sensor is moved by one of a focus unit driving unit and an image sensor driving unit inside the optical system. As a parallax value with higher accuracy can be obtained, a focused state can be achieved more properly through a single feedback. As highly accurate field information can be obtained with use of distance information calculated from the parallax amount, optimal flash shooting can also be performed with use of a non-illustrated flash.

Furthermore, a robot or an automobile that can autonomously generate an action plan can utilize the aforementioned embodiments in order to obtain information for recognizing an external environment. Using the obtained distance information, a non-illustrated external environment recognition unit performs conversion into external environment recognition data. A non-illustrated action plan generation unit generates an action plan in compliance with the external environment recognition data and an objective that has been provided in advance. In accordance with the action plan, autonomous movements are realized by a non-illustrated actuator control unit, which controls a non-illustrated actuator, and the actuator. The actuator includes a prime mover, an electric motor, wheels, and a leg mechanism. As the digital camera can obtain distance information with reduced errors, an external environment can be recognized in a more stable manner.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204117, filed Nov. 11, 2019, which is hereby incorporated by reference herein in its entirety.

What is claimed is:

1. A parallax detecting apparatus comprising at least one processor and/or at least one circuit which functions as:
   a first obtainment unit configured to obtain a first viewpoint image and a second viewpoint image that have different viewpoints from each other in a first direction;
   a second obtainment unit configured to obtain displacement information that specifies a displacement amount in a second direction between positions in the first viewpoint image and the second viewpoint image corresponding to a same position in a shooting range, wherein the displacement amount varies in conformity with a parallax amount in the first direction between the positions, the parallax amount being in conformity with a defocus amount, and wherein the second direction is perpendicular to the first direction;
   a selection unit configured to select, in the first viewpoint image, a base region corresponding to a base position of parallax amount detection;
   a calculation unit configured to perform correlation calculation processing with respect to each of a plurality of reference regions corresponding to a plurality of reference positions in the second viewpoint image, wherein the correlation calculation processing includes first correction processing and calculation processing, wherein the first correction processing corrects at least one of a position of the base region in the second direction and a position of the reference region in the second direction based on the displacement information so as to reduce a displacement that occurs between the base position and the reference position in the second direction and that is in conformity with a parallax amount in the first direction between the base position and the reference position, and wherein the calculation processing calculates a correlation between the base region and the reference region that reflect the first correction processing; and
   a detection unit configured to detect a parallax amount in the first direction at the base position based on each correlation between the base region and each of the plurality of reference regions.

2. The parallax detecting apparatus according to claim 1, wherein in the first correction processing, when a post-correction pixel position of the base region or the reference region that serves as a correction target region is displaced from a pixel position of the first viewpoint image or the second viewpoint image that includes the correction target region, the calculation unit calculates a post-correction pixel value of the correction target region through interpolation computation.

3. The parallax detecting apparatus according to claim 2, wherein the interpolation computation is based on a plurality of pixel values that are continuous in the second direction.

4. The parallax detecting apparatus according to claim 3, wherein the interpolation computation is linear interpolation computation.

5. The parallax detecting apparatus according to claim 2, wherein the interpolation computation is linear interpolation computation based on two pixel values that are continuous in the second direction,
   wherein the at least one processor and/or at least one circuit further functions as a control unit configured to, with respect to at least one of the first viewpoint image and the second viewpoint image, perform control to calculate, with respect to each of a plurality of combinations of two pixel values that are continuous in the second direction, a pixel difference value representing a difference between the two pixel values and record the pixel difference value into a recording unit, and
   wherein in the first correction processing, when linear interpolation computation based on two pixel values corresponding to the pixel difference value recorded in the recording unit is to be performed, the calculation unit performs the linear interpolation computation using the pixel difference value.

6. The parallax detecting apparatus according to claim 1, wherein the at least one processor and/or at least one circuit further functions as a correction unit configured to perform second correction processing for correcting at least one of a position of the first viewpoint image in the second direction and a position of the second viewpoint image in the second direction based on the displacement information so as to reduce a displacement in the second direction that occurs between positions of the first viewpoint image and the second viewpoint image corresponding to a same position in the shooting range in a case where a parallax amount in the first direction between the positions is a specific parallax amount, and
   wherein the calculation unit determines a correction amount for the first correction processing based on the displacement information and a correction amount for the second correction processing.

7. The parallax detecting apparatus according to claim 6, wherein the specific parallax amount is 0.

8. The parallax detecting apparatus according to claim 6, wherein the correction unit determines the specific parallax amount based on a frequency of occurrence of a parallax amount in the first direction in the shooting range.

9. The parallax detecting apparatus according to claim 6, wherein in the second correction processing, when a post-correction pixel position of the first viewpoint image or the second viewpoint image that serves as a correction target image is displaced from a pre-correction pixel position of the correction target image, the correction unit calculates a post-correction pixel value of the correction target image through interpolation computation.

10. The parallax detecting apparatus according to claim 6, wherein the correction unit determines a correction amount for the first viewpoint image and a correction amount for the second viewpoint image in the second correction processing so as to achieve a displacement amount of 0 in the second direction between the positions of the first viewpoint image and the second viewpoint image corresponding to the same position in the shooting range in the case where the parallax amount in the first direction between the positions is the specific parallax amount.

11. The parallax detecting apparatus according to claim 10, wherein the correction unit determines the correction amount for the first viewpoint image and the correction amount for the second viewpoint image in the second correction processing based on a pixel arrangement of an image sensor that has been used in capturing the first viewpoint image and the second viewpoint image, so as to reduce a difference between a correction error in the first viewpoint image and a correction error in the second viewpoint image.

12. The parallax detecting apparatus according to claim 1, wherein in the calculation processing, the calculation unit calculates the correlation between the base region and the reference region based on an SAD (Sum of Absolute Differences), an SSD (Sum of Squared Differences), or a normalized cross correlation.

13. The parallax detecting apparatus according to claim 1, wherein the displacement information includes information indicating an inclination and an intercept in a graph with a horizontal axis representing a parallax amount in the first direction and a vertical axis representing a displacement amount.

14. The parallax detecting apparatus according to claim 1, wherein the second obtainment unit specifies the displacement amount that varies in conformity with a parallax amount in the first direction and obtains the displacement information by performing a two-dimensional search between the first viewpoint image and the second viewpoint image.

15. The parallax detecting apparatus according to claim 14, wherein the second obtainment unit updates the displacement information at a predetermined timing.

16. The parallax detecting apparatus according to claim 1, wherein the displacement information includes information indicating an inclination and an intercept in a graph with a horizontal axis representing a parallax amount in the first direction and a vertical axis representing a displacement amount,
wherein the second obtainment unit specifies the displacement amount that varies in conformity with a parallax amount in the first direction and obtains the displacement information by performing a two-dimensional search between the first viewpoint image and the second viewpoint image, and
wherein the second obtainment unit updates the intercept of the displacement information at a predetermined timing.

17. The parallax detecting apparatus according to claim 1, wherein the detection unit calculates a subject distance at the base position based on the detected parallax amount in the first direction.

18. An image capturing apparatus comprising:
the parallax detecting apparatus according to claim 1, and
an image sensor configured to generate the first viewpoint image and the second viewpoint image.

19. A parallax detecting method executed by a parallax detecting apparatus, the method comprising:
obtaining a first viewpoint image and a second viewpoint image that have different viewpoints from each other in a first direction;
obtaining displacement information that specifies a displacement amount in a second direction between positions in the first viewpoint image and the second viewpoint image corresponding to a same position in a shooting range, wherein the displacement amount varies in conformity with a parallax amount in the first direction between the positions, the parallax amount being in conformity with a defocus amount, and wherein the second direction is perpendicular to the first direction;
selecting, in the first viewpoint image, a base region corresponding to a base position of parallax amount detection;
performing correlation calculation processing with respect to each of a plurality of reference regions corresponding to a plurality of reference positions in the second viewpoint image, wherein the correlation calculation processing includes first correction processing and calculation processing, wherein the first correction processing corrects at least one of a position of the base region in the second direction and a position of the reference region in the second direction based on the displacement information so as to reduce a displacement that occurs between the base position and the reference position in the second direction and that is in conformity with a parallax amount in the first direction between the base position and the reference position, and wherein the calculation processing calculates a correlation between the base region and the reference region that reflect the first correction processing; and
detecting a parallax amount in the first direction at the base position based on each correlation between the base region and each of the plurality of reference regions.

20. A non-transitory computer-readable storage medium which stores a program for causing a computer to execute a parallax detecting method, the method comprising:
obtaining a first viewpoint image and a second viewpoint image that have different viewpoints from each other in a first direction;
obtaining displacement information that specifies a displacement amount in a second direction between positions in the first viewpoint image and the second viewpoint image corresponding to a same position in a shooting range, wherein the displacement amount varies in conformity with a parallax amount in the first direction between the positions, the parallax amount being in conformity with a defocus amount, and wherein the second direction is perpendicular to the first direction;

selecting, in the first viewpoint image, a base region corresponding to a base position of parallax amount detection;

performing correlation calculation processing with respect to each of a plurality of reference regions corresponding to a plurality of reference positions in the second viewpoint image, wherein the correlation calculation processing includes first correction processing and calculation processing, wherein the first correction processing corrects at least one of a position of the base region in the second direction and a position of the reference region in the second direction based on the displacement information so as to reduce a displacement that occurs between the base position and the reference position in the second direction and that is in conformity with a parallax amount in the first direction between the base position and the reference position, and wherein the calculation processing calculates a correlation between the base region and the reference region that reflect the first correction processing; and detecting a parallax amount in the first direction at the base position based on each correlation between the base region and each of the plurality of reference regions.

* * * * *